US009204323B2

(12) United States Patent
Zhang

(10) Patent No.: US 9,204,323 B2
(45) Date of Patent: Dec. 1, 2015

(54) METHOD AND APPARATUS FOR REMOTELY LOCATING WIRELESS NETWORK FAULT

(71) Applicant: Huawei Technologies Co., Ltd., Shenzhen, Guangdong (CN)

(72) Inventor: Yanyong Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 74 days.

(21) Appl. No.: 14/093,130

(22) Filed: Nov. 29, 2013

(65) Prior Publication Data

US 2014/0146687 A1    May 29, 2014

(30) Foreign Application Priority Data

Nov. 28, 2012  (CN) .......................... 2012 1 0494779

(51) Int. Cl.
*H04W 24/04* (2009.01)
*H04L 12/26* (2006.01)
*H04W 24/08* (2009.01)

(52) U.S. Cl.
CPC ........... *H04W 24/04* (2013.01); *H04L 43/0817* (2013.01); *H04W 24/08* (2013.01)

(58) Field of Classification Search
None
See application file for complete search history.

(56) References Cited

U.S. PATENT DOCUMENTS

| 8,626,151 | B2* | 1/2014 | Beppler et al. ................. 455/425 |
| 2009/0227251 | A1 | 9/2009 | Lei et al. |
| 2010/0110903 | A1 | 5/2010 | Spott et al. |
| 2011/0009056 | A1* | 1/2011 | Hanson et al. ..................... 455/9 |
| 2012/0164952 | A1* | 6/2012 | Lee et al. .................... 455/67.11 |
| 2012/0207030 | A1* | 8/2012 | Luong ........................... 370/245 |

FOREIGN PATENT DOCUMENTS

| CN | 101114932 A | 1/2008 |
| CN | 102412999 A | 4/2012 |
| EP | 2615863 A1 | 7/2013 |
| JP | 2012134894 A | 7/2012 |
| RU | 2360378 C1 | 6/2009 |
| WO | WO 2011130444 A1 | 10/2011 |
| WO | WO 2011147339 A1 | 12/2011 |

* cited by examiner

*Primary Examiner* — Kerri Rose
(74) *Attorney, Agent, or Firm* — Leydig, Voit & Mayer, Ltd.

(57) ABSTRACT

The present invention applies to the communications field and provides a method and an apparatus for remotely locating a wireless network fault. The method includes: collecting a running parameter of a wireless network on a terminal side; and sending the collected running parameter of the wireless network on the terminal side to a server. Then the server compares the running parameter of the wireless network on the terminal side with a running parameter of the wireless network on an access point side and which part of the wireless network has a fault is determined according to a comparison result, so that detection is unnecessary on the terminal side when the wireless network is detected to be abnormal on the access point side, thereby improving troubleshooting efficiency and saving labor and reducing costs.

8 Claims, 4 Drawing Sheets

METHOD AND APPARATUS FOR REMOTELY LOCATING WIRELESS NETWORK FAULT

CROSS-REFERENCE TO RELATED APPLICATION

This application claims priority to Chinese Patent Application No. 201210494779.8, filed on Nov. 28, 2012, which is hereby incorporated by reference in its entirety.

TECHNICAL FIELD

The present invention relates to the communications field, and in particular to a method and an apparatus for remotely locating a wireless network fault.

BACKGROUND

On a wireless network, data between an access point side and a terminal side is transmitted by using radio signals. A wireless network frequency band is easily interfered by outside environments, and terminals vary in quality. This easily leads to usage performance degradation or an abnormal access problem to the wireless network on the terminal side.

The usage performance degradation of the network on the terminal side may be resulted from a problem of the wireless network or may be resulted from a problem of a terminal. Generally, when handling a problem, operation and maintenance personnel need to go to a fault site to check, from the terminal side, terminal configuration and radio signal quality and analyze wireless packets so as to troubleshoot and locate a fault. This involves cumbersome steps. In addition, the fault occurs randomly, so the operation and maintenance personnel need to visit a site time and again. This not only leads to low efficiency and a high operation and maintenance cost, but also affects user experience on the network.

SUMMARY

The objective of embodiments of the present invention is to provide a method and an apparatus for remotely locating a wireless network fault that aim to solve a problem that operation and maintenance personnel must go to a site to handle a network problem in the prior art.

According to a first aspect, an embodiment of the present invention provides a method for remotely locating a wireless network fault, including:

collecting a running parameter of a wireless network on a terminal side; and sending the collected running parameter of the wireless network on the terminal side to a server, so that the server compares the running parameter of the wireless network on the terminal side with a running parameter of the wireless network on an access point side and performs a performance analysis for the wireless network according to a comparison result, where the performance analysis includes fault locating.

According to a first possible implementation manner in the first aspect, the step of sending the collected running parameter of the wireless network on the terminal side to a server specifically is:

sending the collected running parameter of the wireless network on the terminal side to the server when the running parameter of the wireless network on the terminal side exceeds a preset threshold; or sending all collected running parameters of the wireless network on the terminal side to the server.

According to a second aspect, an embodiment of the present invention provides a method for remotely locating a wireless network fault, including:

receiving a running parameter of a wireless network on a terminal side that is collected by a first data collector and sending a message for acquiring a running parameter of the wireless network on an access point side to a second data collector, where the first data collector is located on the terminal side and the second data collector is located on the access point side;

receiving the running parameter of the wireless network on the access point side that is collected by the second data collector; and comparing the received running parameter of the wireless network on the terminal side with the running parameter of the wireless network on the access point side and performing a performance analysis for the wireless network according to a comparison result, where the performance analysis includes fault locating.

According to a first possible implementation manner in the second aspect, the receiving a running parameter of a wireless network on a terminal side that is collected by a first data collector includes:

receiving a running parameter sent by the first data collector when the running parameter of the wireless network on the terminal side exceeds a preset threshold; or receiving all collected running parameters of the wireless network on the terminal side that are sent by the first data collector.

According to a third aspect, an embodiment of the present invention provides an apparatus for remotely locating a wireless network fault, including:

a running parameter collecting unit, configured to collect a running parameter of a wireless network on a terminal side; and a running parameter sending unit, configured to send, to a server, the running parameter of the wireless network on the terminal side that is collected by the running parameter collecting unit, so that the server compares the running parameter of the wireless network on the terminal side with a running parameter of the wireless network on an access point side and performs a performance analysis for the wireless network according to a comparison result, where the performance analysis includes fault locating.

According to a first possible implementation manner in the third aspect, the running parameter sending unit includes:

a threshold-exceeding sending subunit, configured to send the collected running parameter of the wireless network on the terminal side to the server when the running parameter of the wireless network on the terminal side exceeds a preset threshold; and an all sending subunit, configured to send all collected running parameters of the wireless network on the terminal side to the server.

According to a fourth aspect, an embodiment of the present invention provides an apparatus for remotely locating a wireless network fault, including:

a terminal-side data receiving unit, configured to receive a running parameter of a wireless network on a terminal side that is collected by a first data collector, where the first data collector is located on the terminal side;

an access-point-side data acquiring request sending unit, configured to send, after the terminal-side data receiving unit receives data, a message for acquiring a running parameter of the wireless network on an access point side to a second data collector, where the second data collector is located on the access point side;

an access-point-side data receiving unit, configured to receive, after the access-point-side data acquiring request sending unit sends the message, the running parameter of the wireless network on the access point side that is collected by the second data collector; and a comparison unit, configured to compare the data received by the terminal-side data receiving unit with data received by the access-point-side data receiving unit and perform a performance analysis for the wireless network according to a comparison result, where the performance analysis includes fault locating.

According to a first possible implementation manner in the fourth aspect, the terminal-side data receiving unit specifically includes:

a threshold-exceeding receiving subunit, configured to receive a running parameter sent by the first data collector when the running parameter of the wireless network on the terminal side exceeds a preset threshold; and an all data receiving subunit, configured to receive all collected running parameters of the wireless network on the terminal side that are sent by the first data collector.

According to the embodiments of the present invention, a data collector is installed on a terminal side to collect running data of a wireless network on the terminal side in real time, the running data of the wireless network on the terminal side is compared with that of the wireless network on an access point side, and which part of the wireless network has a fault is determined according to a comparison result, so that second detection is unnecessary on the terminal side when the wireless network is detected to be abnormal on the access point side; in addition, a change of the running parameter on the entire wireless network may be recorded so as to provide data for a reason analysis of a single terminal fault, thereby improving troubleshooting efficiency and saving labor and reducing costs.

DESCRIPTION OF EMBODIMENTS

To make the objectives, technical solutions, and advantages of the present invention more comprehensible, the following further describes the present invention in detail with reference to the accompanying drawings and embodiments. It is understandable that the specific embodiment is only used to explain the present invention and is not intended to limit the present invention.

Figure 1:
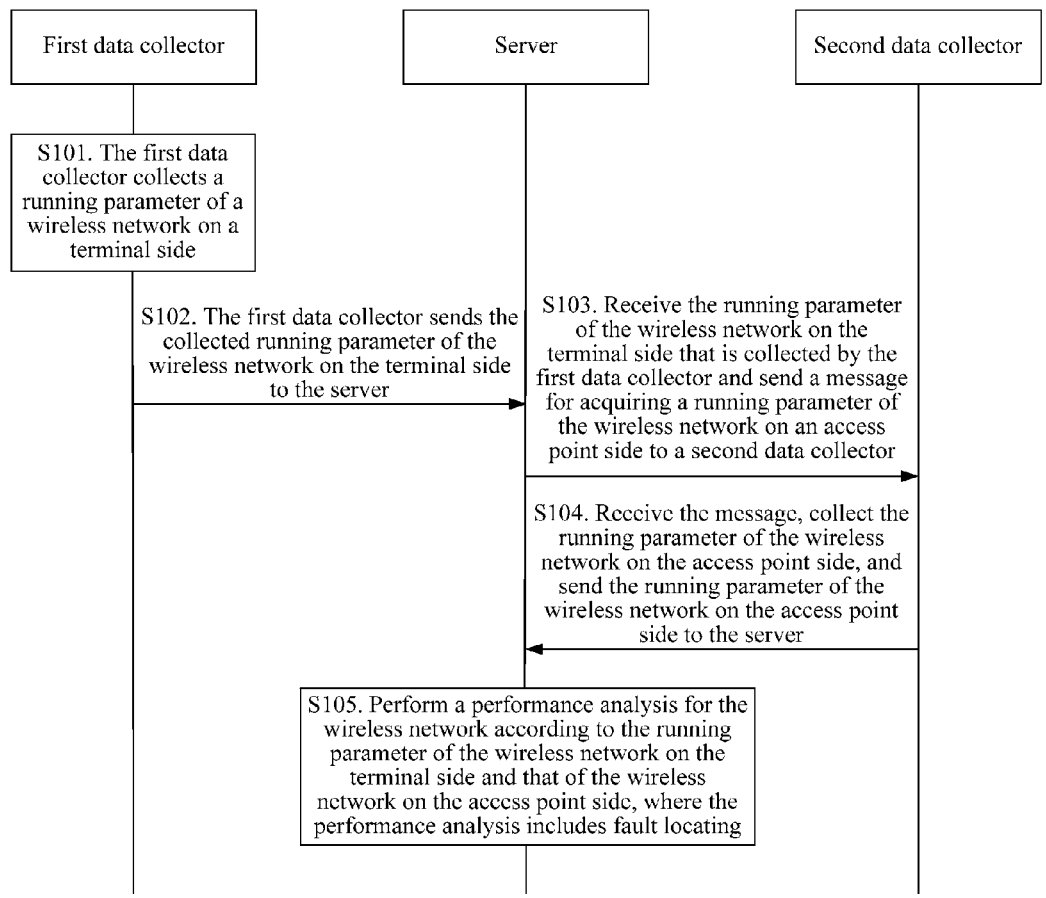
FIG. 1 is a flowchart of a method for remotely locating a wireless network fault according to an embodiment of the present invention.

FIG. 1 is a flowchart of a method for remotely locating a wireless network fault according to an embodiment of the present invention. The method includes:

Step S101: A first data collector collects a running parameter of a wireless network on a terminal side, where the first data collector is located on the terminal side.

In this embodiment of the present invention, the first data collector is a data collecting apparatus located on the terminal side and is configured to collect a running parameter of a wireless network on a terminal side in real time when a terminal uses the wireless network. The running parameter includes delay and success rate data of accessing the wireless network by the terminal, a signal status of the wireless network, input and output rates of network data, a rate of opening a web page by the terminal, status data of a wireless network interface card.

Step S102: The first data collector sends the collected running parameter of the wireless network on the terminal side to a server.

In this embodiment of the present invention, the first data collector sends, to the server, the running parameter of the wireless network that is collected from the terminal. A specific implementation method is as follows:

(1) When the running parameter of the wireless network on the terminal side exceeds a preset threshold, the first data collector sends the collected running parameter of the wireless network on the terminal side to the server.

In this embodiment of the present invention, a threshold of the running parameter of the wireless network on the terminal side is set in the first data collector. When the running parameter exceeds the threshold (for different running parameters, definitions of exceeding are different: some parameters are larger than a threshold; and some parameters are smaller than a threshold), the first data collector sends the collected running parameter of the wireless network on the terminal side to the server.

(2) The first data collector sends all collected running parameters of the wireless network on the terminal side to the server.

In this embodiment of the present invention, the first data collector sends all collected running parameters to the server. This method applies to a long-term performance analysis for a wireless network, and performance of the wireless network may be analyzed by analyzing the running parameter in a certain period of time.

Step S103: The server receives the running parameter of the wireless network on the terminal side that is collected by the first data collector and sends a message for acquiring a running parameter of the wireless network on an access point side to a second data collector, where the second data collector is located on the access point side.

In this embodiment of the present invention, after receiving the running parameter of the wireless network on the terminal side that is collected by the first data collector, the server sends the message for acquiring the running parameter of the wireless network on the access point side to the second data collector.

Step S104: The second data collector receives the message, collects the running parameter of the wireless network on the access point side, and sends the running parameter of the wireless network on the access point side to the server.

In this embodiment of the present invention, in addition to collecting the running parameter of the wireless network on the access point side, the second data collector may further collect packet information on the access point side so as to allow the server to better perform a performance analysis for the wireless network.

Step S105: The server receives the running parameter of the wireless network on the access point side and performs a performance analysis for the wireless network according to the running parameter of the wireless network on the terminal side and that of the wireless network on the access point side, where the performance analysis includes fault locating.

In this embodiment of the present invention, after receiving the running parameter of the wireless network on the access point side, the server compares the running parameter on the access point side with that on the terminal side and performs a performance analysis for the wireless network according to a comparison result, where the performance analysis includes but is not limited to: determining which part of the wireless network has a fault.

According to the embodiments of the present invention, a data collector is installed on a terminal side to collect running data of a wireless network on the terminal side in real time, the running data of the wireless network on the terminal side is compared with that of the wireless network on an access point side, and which part of the wireless network has a fault is determined according to a comparison result, so that second detection is unnecessary on the terminal side when the wireless network is detected to be normal on the access point side; in addition, a change of the running parameter on the entire wireless network may be recorded so as to provide data for a reason analysis of other terminal faults, thereby improving troubleshooting efficiency and saving labor and reducing costs.

For example:

A transmission rate of a wireless network is used as an example for description:

It is assumed that the wireless network provides a terminal with a download rate of 200 kb/s. A threshold of the rate is set to 150 kb/s because of various impact factors. When the download rate of the terminal is less than 150 kb/s for three seconds, a data collector installed on the terminal side sends the running status information such as the current download rate and radio signal status of the terminal to a server. The server acquires running information of an access point that corresponds to the wireless network such as a transmission rate, packet loss ratio, and radio signal status and analyzes a fault of the wireless network according to the running status information of the wireless network on the access point side and that of the terminal.

Figure 2:
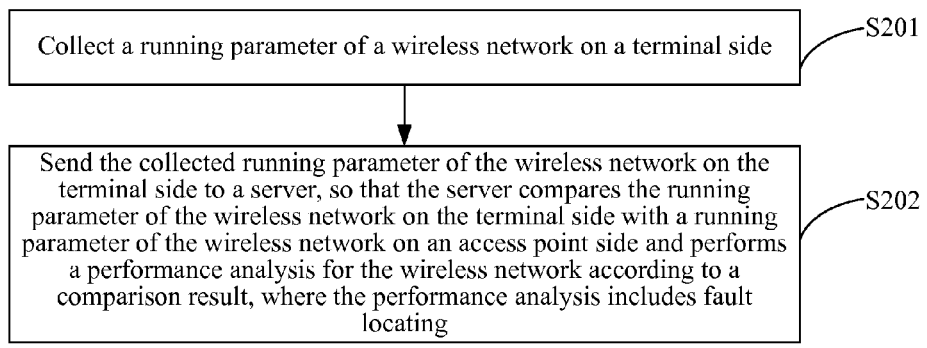
FIG. 2 is a flowchart of a method for remotely locating a wireless network fault according to another embodiment of the present invention.

FIG. 2 is a flowchart of a method for remotely locating a wireless network fault according to another embodiment of the present invention. The method includes:

Step S201: Collect a running parameter of a wireless network on a terminal side.

In this embodiment of the present invention, a first data collector is a data collecting apparatus located on the terminal side and is configured to collect a running parameter of a wireless network on a terminal side in real time when a terminal uses the wireless network. The running parameter includes but is not limited to: delay and success rate data of accessing the wireless network by the terminal, a signal status of the wireless network, input and output rates of network data, a rate of opening a web page by the terminal, status data of a wireless network interface card.

Step S202: Send the collected running parameter of the wireless network on the terminal side to a server, so that the server compares the running parameter of the wireless network on the terminal side with a running parameter of the wireless network on an access point side and performs a performance analysis for the wireless network according to a comparison result, where the performance analysis includes fault locating.

In this embodiment of the present invention, the first data collector sends, to the server, the running parameter of the wireless network that is collected from the terminal. A specific implementation method is as follows:

(1) When the running parameter of the wireless network on the terminal side exceeds a preset threshold, the first data collector sends the collected running parameter of the wireless network on the terminal side to the server.

In this embodiment of the present invention, a threshold of the running parameter of the wireless network on the terminal side is set in the first data collector. When the running parameter exceeds the threshold (for different running parameters, definitions of exceeding are different: some parameters are larger than a threshold; and some parameters are smaller than a threshold), the first data collector sends the collected running parameter on the terminal side to the server.

(2) The first data collector sends all collected running parameters of the wireless network on the terminal side to the server.

In this embodiment of the present invention, the first data collector sends all collected running parameters to the server. This method applies to a long-term performance analysis for a wireless network, and performance of the wireless network may be analyzed by analyzing the running parameter in a certain period of time. After receiving the running parameter of the wireless network on the access point side, the server compares the running parameter on the access point side with that on the terminal side and performs a performance analysis for the wireless network according to a comparison result, where the performance analysis includes but is not limited to: determining which part of the wireless network has a fault.

According to the embodiments of the present invention, a data collector is installed on a terminal side to collect running data of a wireless network on the terminal side in real time, the running data of the wireless network on the terminal side is compared with that of the wireless network on an access point side, and which part of the wireless network has a fault is determined according to a comparison result, so that second detection is unnecessary on the terminal side when the wireless network is detected to be normal on the access point side; in addition, a change of the running parameter on the entire wireless network may be recorded so as to provide data for a reason analysis of a single terminal fault, thereby improving troubleshooting efficiency and saving labor and reducing costs.

Figure 3:
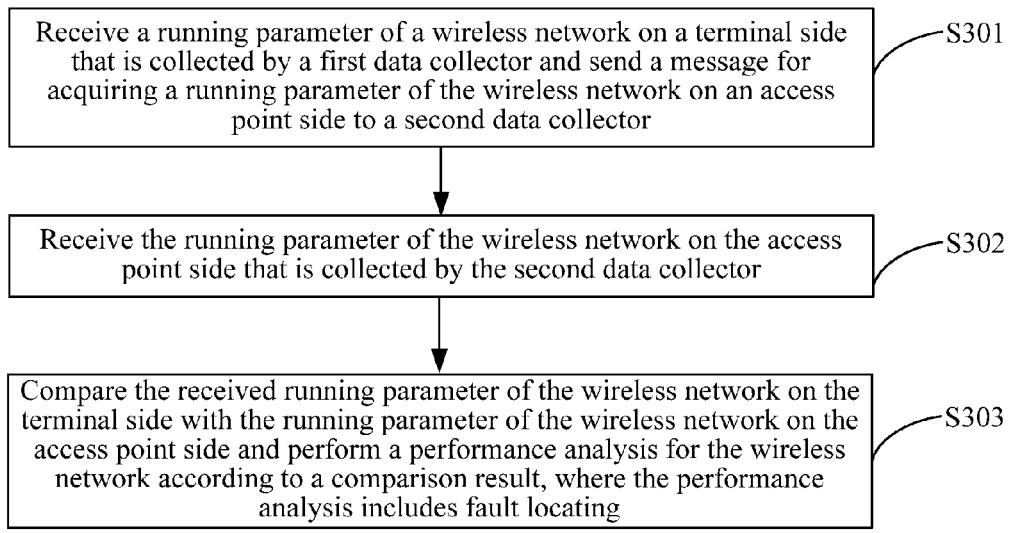
FIG. 3 is a flowchart of a method for remotely locating a wireless network fault according to still another embodiment of the present invention.

FIG. 3 is a flowchart of a method for remotely locating a wireless network fault according to still another embodiment of the present invention. The method includes:

Step S301: Receive a running parameter of a wireless network on a terminal side that is collected by a first data collector and send a message for acquiring a running parameter of the wireless network on an access point side to a second data collector, where the first data collector is located on the terminal side and the second data collector is located on the access point side.

In this embodiment of the present invention, after receiving the running parameter of the wireless network on the terminal side that is collected by the first data collector, a server sends the message for acquiring the running parameter of the wireless network on the access point side to the second data collector. The receiving, by the server, the running parameter of the wireless network on the terminal side that is collected by the first data collector includes:

receiving a running parameter sent by the first data collector when the running parameter of the wireless network on the terminal side exceeds a preset threshold; or receiving all collected running parameters of the wireless network on the terminal side that are sent by the first data collector.

Step S302: Receive the running parameter of the wireless network on the access point side that is collected by the second data collector.

In this embodiment of the present invention, in addition to collecting the running parameter of the wireless network on the access point side, the second data collector may further collect packet information on the access point side so as to allow the server to better perform a performance analysis for the wireless network.

Step S303: Compare the received running parameter of the wireless network on the terminal side with the running parameter of the wireless network on the access point side and perform a performance analysis for the wireless network according to a comparison result, where the performance analysis includes fault locating.

In this embodiment of the present invention, after receiving the running parameter of the wireless network on the access point side, the server compares the running parameter on the access point side with that on the terminal side and performs a performance analysis for the wireless network according to a comparison result, where the performance analysis includes but is not limited to: determining which part of the wireless network has a fault.

According to the embodiments of the present invention, a data collector is installed on a terminal side to collect running data of a wireless network on the terminal side in real time, the running data of the wireless network on the terminal side is compared with that of the wireless network on an access point side, and which part of the wireless network has a fault is determined according to a comparison result, so that second detection is unnecessary on the terminal side when the wireless network is detected to be normal on the access point side; in addition, a change of the running parameter on the entire wireless network may be recorded so as to provide data for a reason analysis of a single terminal fault, thereby improving troubleshooting efficiency and saving labor and reducing costs.

Figure 4:
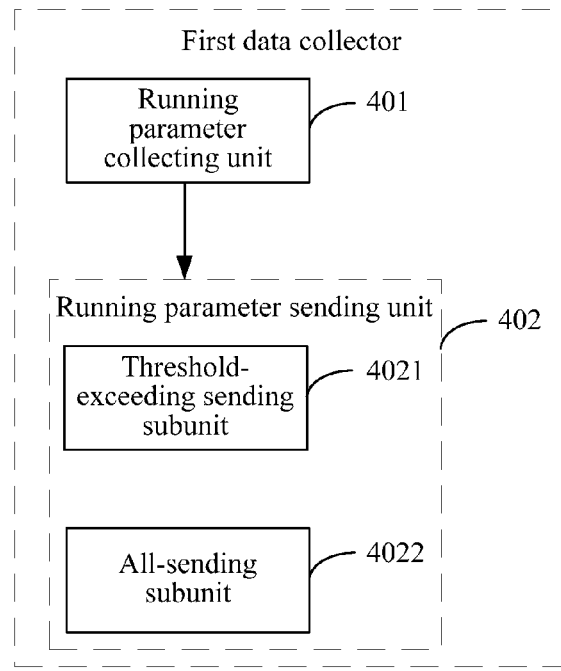
FIG. 4 is a structural diagram of a first data collector according to an embodiment of the present invention.

FIG. 4 is a structural diagram of a first data collector according to an embodiment of the present invention. For ease of illustration, only a part of the first data collector that relates to this embodiment of the present invention is shown, including a running parameter collecting unit 401 and a running parameter sending unit 402.

The running parameter collecting unit 401 is configured to collect a running parameter of a wireless network on a terminal side.

In this embodiment of the present invention, a first data collector is a data collecting apparatus located on the terminal side and is configured to collect a running parameter of a wireless network on a terminal side in real time when a terminal uses the wireless network. The running parameter includes but is not limited to: delay and success rate data of accessing the wireless network by the terminal, a signal status of the wireless network, input and output rates of network data, a rate of opening a web page by the terminal, status data of a wireless network interface card.

The running parameter sending unit 402 is configured to send, to a server, the running parameter of the wireless network on the terminal side that is collected by the running parameter collecting unit 401, so that the server compares the running parameter of the wireless network on the terminal side with a running parameter of the wireless network on an access point side and performs a performance analysis for the wireless network according to a comparison result, where the performance analysis includes fault locating.

In this embodiment of the present invention, the first data collector sends, to the server, the running parameter of the wireless network that is collected from the terminal. The running parameter sending unit 402 specifically includes a threshold-exceeding sending subunit 4021 and an all-sending subunit 4022.

The threshold-exceeding sending subunit 4021 is configured to send the collected running parameter of the wireless network on the terminal side to the server when the running parameter of the wireless network on the terminal side exceeds a preset threshold.

In this embodiment of the present invention, a threshold of the running parameter of the wireless network on the terminal side is set in the first data collector. When the running parameter exceeds the threshold (for different running parameters, definitions of exceeding are different: some parameters are larger than a threshold; and some parameters are smaller than a threshold), the first data collector sends the collected running parameter on the terminal side to the server.

The all-sending subunit 4022 is configured to send all collected running parameters of the wireless network on the terminal side to the server.

In this embodiment of the present invention, the first data collector sends all collected running parameters to the server. This method applies to a long-term performance analysis for a wireless network, and performance of the wireless network may be analyzed by analyzing the running parameter in a certain period of time. After receiving the running parameter of the wireless network on the access point side, the server compares the running parameter on the access point side with that on the terminal side and performs a performance analysis for the wireless network according to a comparison result, where the performance analysis includes but is not limited to: determining which part of the wireless network has a fault.

According to the embodiments of the present invention, a data collector is installed on a terminal side to collect running data of a wireless network on the terminal side in real time, the running data of the wireless network on the terminal side is compared with that of the wireless network on an access point side, and which part of the wireless network has a fault is determined according to a comparison result, so that second detection is unnecessary on the terminal side when the wireless network is detected to be normal on the access point side; in addition, a change of the running parameter when a fault occurs may be recorded so as to provide data for a reason analysis of other terminal faults, thereby improving troubleshooting efficiency and saving labor and reducing costs.

Figure 5:
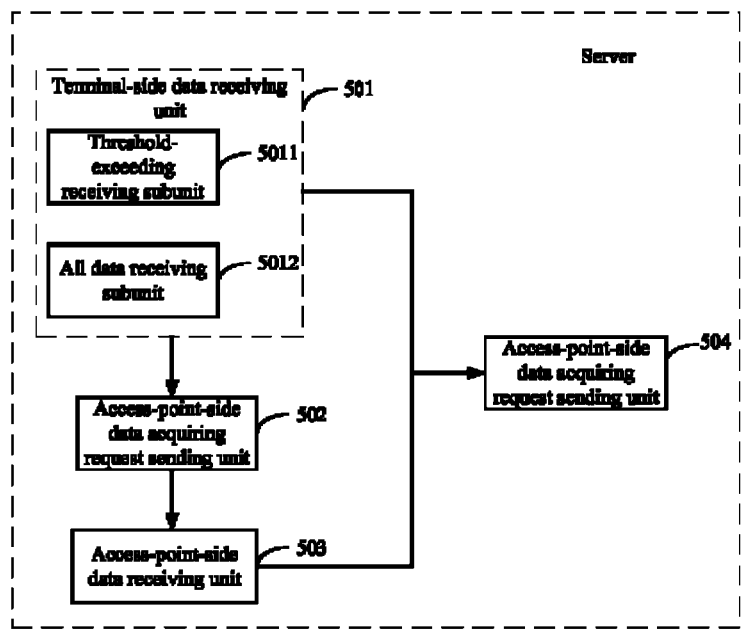
FIG. 5 is a structural diagram of a server according to an embodiment of the present invention.

FIG. 5 is a structural diagram of a server according to an embodiment of the present invention. For ease of illustration, only a part of the server that relates to this embodiment of the present invention is shown, including a terminal-side data receiving unit 501, an access-point-side data acquiring request sending unit 502, an access-point-side data receiving unit 503, and a comparison unit 504.

The terminal-side data receiving unit 501 is configured to receive a running parameter of a wireless network on a terminal side that is collected by a first data collector, where the first data collector is located on the terminal side.

The access-point-side data acquiring request sending unit 502 is configured to send, after the terminal-side data receiving unit 501 receives data, a message for acquiring a running parameter of the wireless network on an access point side to a second data collector, where the second data collector is located on the access point side.

In this embodiment of the present invention, after receiving the running parameter of the wireless network on the terminal side that is collected by the first data collector, a server sends the message for acquiring the running parameter of the wireless network on the access point side to the second data collector. The terminal-side data receiving unit 501 specifically includes:

a threshold-exceeding receiving subunit 5011, configured to receive a running parameter sent by the first data collector when the running parameter of the wireless network on the terminal side exceeds a preset threshold; and an all data receiving subunit 5012, configured to receive all collected running parameters of the wireless network on the terminal side that are sent by the first data collector.

The access-point-side data receiving unit 503 is configured to receive, after the access-point-side data acquiring request sending unit 502 sends the message, the running parameter of the wireless network on the access point side that is collected by the second data collector.

In this embodiment of the present invention, in addition to collecting the running parameter of the wireless network on the access point side, the second data collector may further collect packet information on the access point side so as to allow the server to better perform a performance analysis for the wireless network.

The comparison unit 504 is configured to compare the data received by the terminal-side data receiving unit 501 with data received by the access-point-side data receiving unit 503 and perform a performance analysis for the wireless network according to a comparison result, where the performance analysis includes fault locating.

In this embodiment of the present invention, after receiving the running parameter of the wireless network on the access point side, the server compares the running parameter on the access point side with that on the terminal side and performs a performance analysis for the wireless network according to a comparison result, where the performance analysis includes but is not limited to: determining which part of the wireless network has a fault.

According to the embodiments of the present invention, a data collector is installed on a terminal side to collect running data of a wireless network on the terminal side in real time, the running data of the wireless network on the terminal side is compared with that of the wireless network on an access point side, and which part of the wireless network has a fault is determined according to a comparison result, so that second detection is unnecessary on the terminal side when the wireless network is detected to be normal on the access point side; in addition, a change of the running parameter on the entire wireless network may be recorded so as to provide data for a reason analysis of a single terminal fault, thereby improving troubleshooting efficiency and saving labor and reducing costs.

Figure 6:
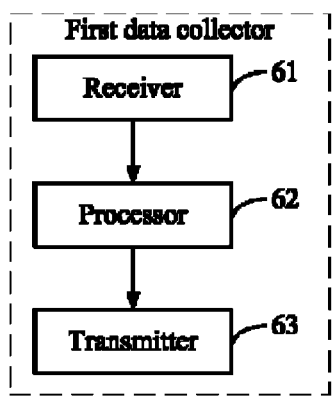
FIG. 6 is a structural diagram of a first data collector according to an embodiment of the present invention.

FIG. 6 is a structural diagram of a first data collector according to an embodiment of the present invention. For ease of illustration, only a part of the first data collector that relates to this embodiment of the present invention is shown. The first data collector includes a receiver 61, a processor 62, and a transmitter 63, where the processor 62 executes the following steps:

Collect a running parameter of a wireless network on a terminal side.

In this embodiment of the present invention, the first data collector is a data collecting apparatus located on the terminal side and is configured to collect a running parameter of a wireless network on a terminal side in real time when a terminal uses the wireless network. The running parameter includes but is not limited to: delay and success rate data of accessing the wireless network by the terminal, a signal status of the wireless network, input and output rates of network data, a rate of opening a web page by the terminal, status data of a wireless network interface card.

Send the collected running parameter of the wireless network on the terminal side to a server, so that the server compares the running parameter of the wireless network on the terminal side with a running parameter of the wireless network on an access point side and performs a performance analysis for the wireless network according to a comparison result, where the performance analysis includes fault locating.

In this embodiment of the present invention, the first data collector sends, to the server, the running parameter of the wireless network that is collected from the terminal. A specific implementation method is as follows:

(1) When the running parameter of the wireless network on the terminal side exceeds a preset threshold, the first data collector sends the collected running parameter of the wireless network on the terminal side to the server.

In this embodiment of the present invention, a threshold of the running parameter of the wireless network on the terminal side is set in the first data collector. When the running parameter exceeds the threshold (for different running parameters, definitions of exceeding are different: some parameters are larger than a threshold; and some parameters are smaller than a threshold), the first data collector sends the collected running parameter on the terminal side to the server.

(2) The first data collector sends all collected running parameters of the wireless network on the terminal side to the server.

In this embodiment of the present invention, the first data collector sends all collected running parameters to the server. This method applies to a long-term performance analysis for a wireless network, and performance of the wireless network may be analyzed by analyzing the running parameter in a certain period of time. After receiving the running parameter of the wireless network on the access point side, the server compares the running parameter on the access point side with that on the terminal side and performs a performance analysis for the wireless network according to a comparison result, where the performance analysis includes but is not limited to: determining which part of the wireless network has a fault.

According to the embodiments of the present invention, a data collector is installed on a terminal side to collect running data of a wireless network on the terminal side in real time, the running data of the wireless network on the terminal side is compared with that of the wireless network on an access point side, and which part of the wireless network has a fault is determined according to a comparison result, so that second detection is unnecessary on the terminal side when the wireless network is detected to be normal on the access point side; in addition, a change of the running parameter when a fault occurs may be recorded so as to provide data for a reason analysis of other terminal faults, thereby improving troubleshooting efficiency and saving labor and reducing costs.

Figure 7:
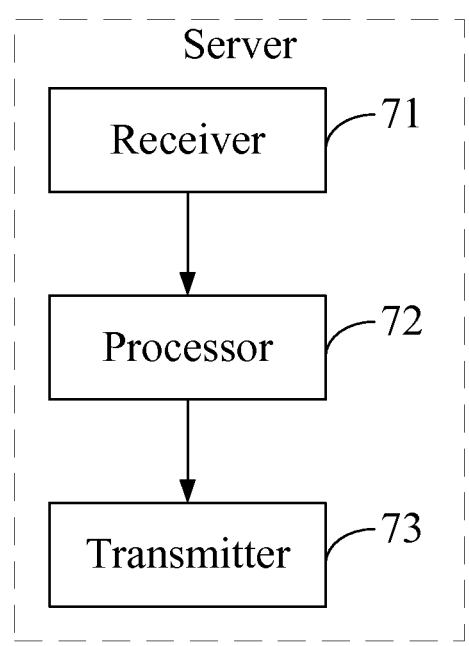
FIG. 7 is a structural diagram of a server according to an embodiment of the present invention.

FIG. 7 is a structural diagram of a server according to an embodiment of the present invention. For ease of illustration, only a part of the server that relates to this embodiment of the present invention is shown. The server includes a receiver 71, a processor 72, and a transmitter 73, where the processor 72 executes the following steps:

Receive a running parameter of a wireless network on a terminal side that is collected by a first data collector and send a message for acquiring a running parameter of the wireless network on an access point side to a second data collector, where the first data collector is located on the terminal side and the second data collector is located on the access point side.

In this embodiment of the present invention, after receiving the running parameter of the wireless network on the terminal side that is collected by the first data collector, the server sends the message for acquiring the running parameter of the wireless network on the access point side to the second data collector. The running parameter of the wireless network on the terminal side that is collected by the first data collector and received by the server includes:

receiving a running parameter sent by the first data collector when the running parameter of the wireless network on the terminal side exceeds a preset threshold; or receiving all collected running parameters of the wireless network on the terminal side that are sent by the first data collector.

Receive the running parameter of the wireless network on the access point side that is collected by the second data collector.

In this embodiment of the present invention, in addition to collecting the running parameter of the wireless network on the access point side, the second data collector may further collect packet information on the access point side so as to allow the server to better perform a performance analysis for the wireless network.

Compare the received running parameter of the wireless network on the terminal side with the running parameter of the wireless network on the access point side and perform a performance analysis for the wireless network according to a comparison result, where the performance analysis includes fault locating.

In this embodiment of the present invention, after receiving the running parameter of the wireless network on the access point side, the server compares the running parameter on the access point side with that on the terminal side and performs a performance analysis for the wireless network according to a comparison result, where the performance analysis includes but is not limited to: determining which part of the wireless network has a fault.

According to the embodiments of the present invention, a data collector is installed on a terminal side to collect running data of a wireless network on the terminal side in real time, the running data of the wireless network on the terminal side is compared with that of the wireless network on an access point side, and which part of the wireless network has a fault is determined according to a comparison result, so that second detection is unnecessary on the terminal side when the wireless network is detected to be normal on the access point side; in addition, a change of the running parameter when a fault occurs may be recorded so as to provide data for a reason analysis of other terminal faults, thereby improving troubleshooting efficiency and saving labor and reducing costs.

The foregoing descriptions are merely exemplary embodiments of the present invention, but are not intended to limit the present invention. All modifications, equivalent replacements, and improvements made within the spirit and principle of the present invention shall fall within the scope of the present invention.

What is claimed is:

1. A method for locating a wireless network fault by a server comprising:

receiving a first running parameter of a wireless network is collected by a first data collector when the terminal uses the wireless network and sent by the first data collector when the first running parameter exceeds a preset threshold of at least one of a transmission rate, packet loss ratio, or radio signal status;

sending a message for acquiring a second running parameter of the wireless network on an access point side to a second data collector, wherein the first data collector is located on the terminal side and the second data collector is located on the access point side;

receiving the second running parameter of the wireless network that is collected by the second data collector, wherein the second running parameter comprises one or more of: a transmission rate; packet loss ratio; or radio signal status;

comparing the first running parameter with the second running parameter; and based on a result of the comparing, determining the terminal side of the wireless network having a fault or the access point side of the wireless network having a fault.

2. The method according to claim 1, wherein the first running parameter of the wireless network on the terminal side comprises one or more of the following:

delay and success rate data of accessing the wireless network by the terminal;

a signal status of the wireless network;

input and output rates of network data;

a rate of opening a web page by the terminal; and status data of a wireless network interface card.

3. An apparatus on a terminal side for locating a wireless network fault, the apparatus comprising a processor executing instructions to perform:

collecting a first running parameter of a wireless network on the terminal side when the terminal uses the wireless network; and sending the first running parameter of the wireless network on the terminal side to a server when the first running parameter exceeds a preset threshold, to make the server sending a message for acquiring a second running parameter of the wireless network on an access point side to a second data collector, wherein the second running parameter of the wireless network on the access point side comprises one or more of: a transmission rate; packet loss ratio; or radio signal status, comparing the first running parameter with the second running parameter and determining the terminal side of the wireless network or the access point side of the wireless network having a fault according to a result of the comparing.

4. The apparatus according to claim 3, wherein the first running parameter of the wireless network on the terminal side comprises one or more of the following:

delay and success rate data of accessing the wireless network by the terminal;

a signal status of the wireless network;

input and output rates of network data;

a rate of opening a web page by the terminal; and status data of a wireless network interface card.

5. A system for locating a wireless network fault, comprising: a server, a first data collector located on a terminal side of a wireless network, and a second data collector located on an access point side of the wireless network; wherein, the first data collector being configured to:

collect a first running parameter of the wireless network on the terminal side when the terminal uses the wireless network; and send the first running parameter of the wireless network on the terminal side to the server when the first running parameter of the wireless network on the terminal side exceeds a preset threshold, wherein the preset threshold relates to at least one of a transmission rate; packet loss ratio; or radio signal status;

the server being configured to:
- receive the first running parameter sent by the first data collector;
- send a message for acquiring a second running parameter of the wireless network on the access point side to the second data collector;
- receive the second running parameter sent by the second data collector, wherein the second running parameter of the wireless network on the access point side comprises one or more of: a transmission rate; packet loss ratio; or radio signal status;
- compare the first running parameter with the second running parameter; and
- based on a result of the comparing, determine the terminal side of the wireless network having a fault or the access point side of the wireless network having a fault;

the second data collector being configured to:
- receive the message for acquiring the second running parameter from the server;
- collect the second running parameter of the wireless network on the access point side; and
- send the second running parameter to the server.

6. The system according to claim 5, wherein the first running parameter of the wireless network on the terminal side comprises one or more of the following:
- delay and success rate data of accessing the wireless network by the terminal;
- a signal status of the wireless network;
- input and output rates of network data;
- a rate of opening a web page by the terminal; and
- status data of a wireless network interface card.

7. The system according to claim 5, wherein the second data collector is further configured to:
- collect packet information on the access point side; and
- send the collected packet information to the server for better determining which part of the wireless network has a fault.

8. An apparatus for locating a wireless network fault, comprising a processor executing instructions to perform:
- receive a first running parameter of a wireless network on a terminal side that is collected by a first data collector when the terminal uses the wireless network and sent by the first data collector when the first running parameter of the wireless network on the terminal side exceeds a preset threshold wherein the preset threshold relates to at least one of the following: a transmission rate; packet loss ratio; or radio signal status;
- send a message for acquiring a second running parameter of the wireless network on the access point side to a second data collector, wherein the first data collector is located on the terminal side and the second data collector is located on the access point side;
- receive the second running parameter of the wireless network on the access point side that is collected by the second data collector, wherein the second running parameter of the wireless network on the access point side comprises one or more of: a transmission rate; packet loss ratio; or radio signal status;
- compare the first running parameter of the wireless network on the terminal side with the second running parameter of the wireless network on the access point side; and
- based on a result of the comparing, determine the terminal side of the wireless network having a fault or the access point side of the wireless network having a fault.

* * * * *